United States Patent
Eguchi et al.

(10) Patent No.: US 6,917,575 B2
(45) Date of Patent: Jul. 12, 2005

(54) AUDIO SIGNAL PROCESSOR

(75) Inventors: Hiroyasu Eguchi, Tokorozawa (JP); Takeaki Funada, Tokorozawa (JP); Kensuke Chiba, Tokyo-to (JP); Gen Inoshita, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 624 days.

(21) Appl. No.: 10/127,415

(22) Filed: Apr. 23, 2002

(65) Prior Publication Data

US 2002/0159375 A1 Oct. 31, 2002

(30) Foreign Application Priority Data

Apr. 27, 2001 (JP) ........................................ 2001-133292

(51) Int. Cl.$^7$ ............................................... G11B 7/00
(52) U.S. Cl. .................... 369/91; 369/124.02; 369/47.2
(58) Field of Search ............................... 369/84, 30.06, 369/30.05, 83, 124.02, 47.2

(56) References Cited

U.S. PATENT DOCUMENTS

| | | |
|---|---|---|
| 5,422,430 A | 6/1995 | Ikeya et al. |
| 5,553,150 A | 9/1996 | Kozuki |
| 5,749,073 A | 5/1998 | Slaney |
| 6,587,408 B1 * | 7/2003 | Jacobson et al. ........ 369/44.16 |

* cited by examiner

Primary Examiner—Nabil Hindi
(74) Attorney, Agent, or Firm—Young & Thompson

(57) ABSTRACT

An audio signal processor performs a signal processing on the first audio signal and the second audio signal in correspondence with an operation to produce an output. The processor comprises and operation device, a signal processing device and a control device. The operation device is operatively movable between one end and the other end. The one end is associated with the first audio signal and the other end is associated with the second audio signal. The signal processing device performs a signal processing on any one of the first audio signal and the second audio signal to provide at least one kind of predetermined effect. The control device controls the signal processing device so that the effect is provided for any one of the first audio signal and the second audio signal at a predetermined timing based on a position of the operation device and a moving direction thereof.

9 Claims, 6 Drawing Sheets

AUDIO SIGNAL PROCESSOR

BACKGROUND OF THE INVENTION

1. Field of the Invention

The present invention relates to an audio signal processor for performing a signal processing on two audio signals in correspondence with an external operation to produce an output.

2. Description of the Related Art

In a musical performance in a discotheque or a nightclub, a so-called DJ (disc jockey) plays a role in skillfully operating a plurality of record players and a sound mixer to join or mix sequential pieces of music with each other, thus producing musical sounds suitable for a dance. In the past, the DJ's operation has been carried out exclusively with the use of analogue records. Decrease in availability of such analogue records leads to the needs for carrying out the above-described DJ's operation utilizing compact discs, which are widely available. Thus, attention has been directed to a CD player capable of externally controlling functions of reproduction, pause and the like and operational conditions including a reproduction speed in response to the DJ's operation (hereinafter referred to as the "DJ-compatible CD player"). If such a DJ-compatible CD player is used in combination with a mixer for the DJ's operation, the availability thereof is enhanced so that it becomes useful to a professional DJ, as well as enables a DJ hobbyist to easily enjoy the DJ's operation.

Typically, in the DJ's operation utilizing the above-described DJ-compatible CD player in combination with the mixer, when a number being reproduced is to be joined to the next number, a reproduction speed and a reproduction position are previously adjusted, and then at a predetermined timing, the number being reproduced is joined to the next number through cross-fading with the mixer. In order to perform such an operation, the mixer is provided with a cross-fader that outputs two numbers in a mixed state at a predetermined ratio according to a position of the operation device.

When the two numbers are joined to each another with the use of such a cross-fader, a user may wish not only to adjust a volume, but also to add certain effects to the number for an enhanced performance effect. For example, when joining the two numbers to each another, the number being reproduced may be joined to the next number by gradually reducing the volume thereof while adding an echo effect to a predetermined part thereof. However, in order to implement such an operation, it is required to simultaneously perform the operations of varying the volume with the use of the cross-fader and of adding an effect, such as echo, to the number. This is highly difficult and burdensome for a DJ. Besides, distracted by such a complicated operation, the basic operation of joining the two numbers may be failed.

Therefore, in view of these problems, an object of the present invention is to provide an audio signal processor capable of realizing the operation of joining two numbers by adding an effect corresponding to a DJ's operation to an audio signal and the DJ's operation with an enhanced operability and functionality.

SUMMARY OF THE INVENTION

According to the present invention, when the movable operation device is moved from one end to the other end through the DJ's operation, two audio signals are output with the effect added to one of the signals at the predetermined timing based on the position and moving direction of the operation device. Therefore, in case where a DJ wants to add an effect such as an echo to the audio signal when joining two numbers together, the DJ's operation can be performed with a successful effect added to the signal without a complicated operation.

According to the present invention, since the effect is added to the audio signal utilizing a parameter associated with the position of the operation device, the numbers can be joined together while the state of the effect is varied in the DJ's operation, so that the performance effect can be enhanced.

According to the present invention, since the effect is added to the audio signal while varying the volume according to the position of the operation device, the numbers can be joined together through a common operation for the volume and the effect in the DJ's operation, so that the operability can be further improved.

According to the present invention, when the operation device is moved, the effect is added if the operation device is located in the range between the two reference positions, so that the effect can be added at an appropriate timing in response to the moving operation when joining the numbers together.

According to the present invention, since the effect is added to the signal at the timing when the operation device, which is moved to the center from one end or the other, beyond the first or second reference position, the timing at which the addition of the effect is started is ensured and the operability can be further improved.

According to the present invention, the effect to be added to the signal can be selected among from a plurality of kinds of effects and the effect can be previously set by the effect setting device, various effect can be added when joining the numbers together through the DJ's operation, so that the functionality can be enhanced.

According to the present invention, since any one of the effect mode and the normal mode can be selected, the effect mode allowing the above-described function to be realized, on the one hand, and the normal mode allowing the conventional operation with the use of the cross-fader to be realized when joining the numbers together through the DJ's operation, on the other hand, an appropriate operation method can be applied by a personal preference.

According to the present invention, since the effect is added to the audio signal supplied from the reproduction device, and the operation condition of the reproduction device is controlled by the operation device, the operational control of the reproduction device and the addition of the effect can be accomplished with a common operation, so that the operability and functionality can be enhanced.

According to the present invention, since a CD player, for example, is used as the reproduction device, the above-described DJ's operation can be realized using a versatile recording medium.

DETAILED DESCRIPTION OF THE PREFERRED EMBODIMENTS

Now, a preferred embodiment of the present invention will be described with reference to the drawings. In this embodiment, there is described an audio reproduction device serving as a DJ-compatible CD player, to which an audio signal processor according to the present invention is applied.

Figure 1:
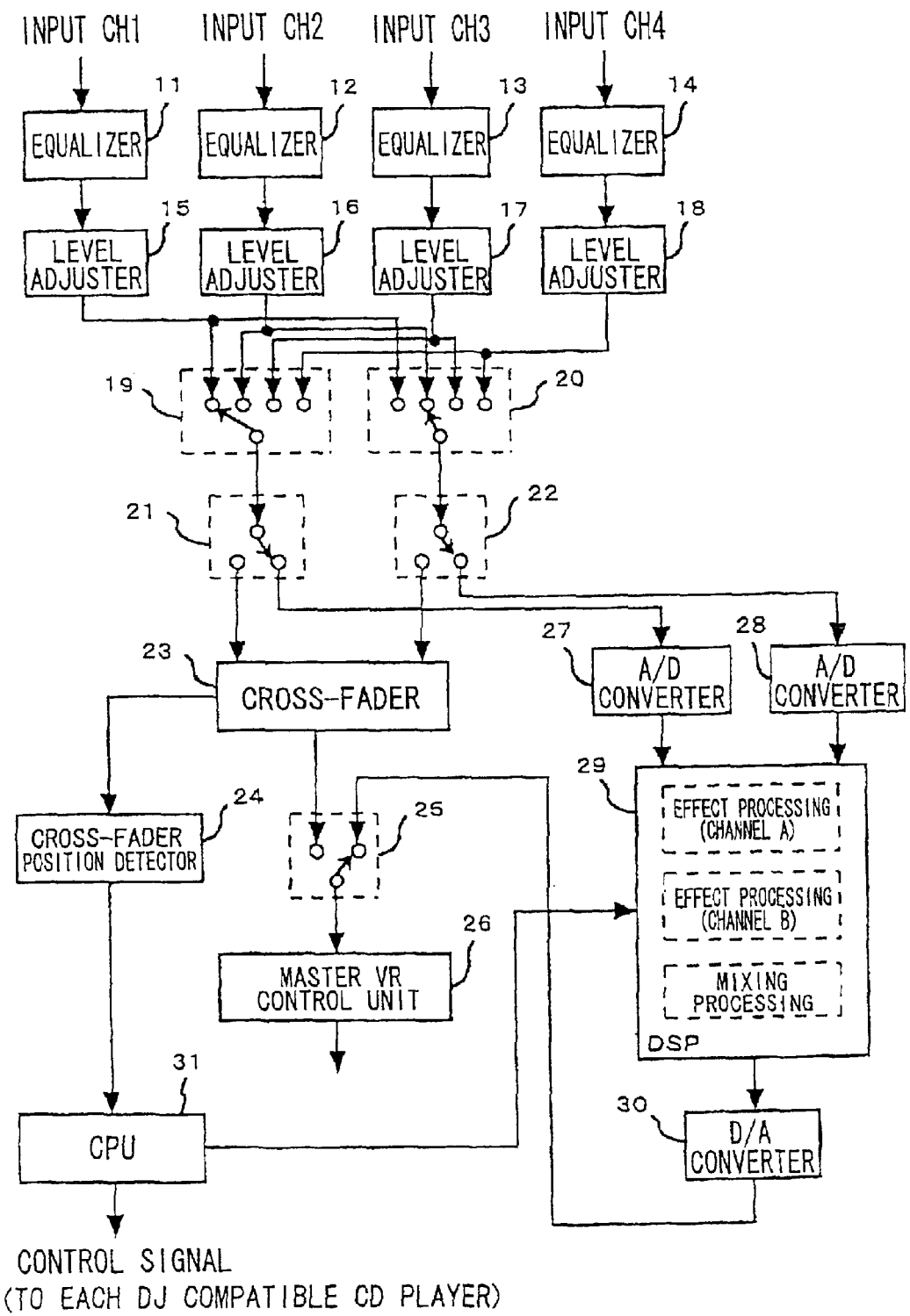
FIG. 1 is a block diagram illustrating an entire configuration of an audio reproduction device according to the embodiment of the present invention.

FIG. 1 is a block diagram illustrating an entire configuration of the audio reproduction device according to the present invention. The audio reproduction device as shown in FIG. 1 has a structure that generates an output signal by performing various kinds of processing on an audio signal reproduced by a DJ-compatible CD player externally connected thereto. In FIG, 1, the audio reproduction device comprises equalizers 11 to 14, level adjusters 15 to 18, the first assigning switch section 19, the second assigning switch section 20, the first selection switching section 21, the second selection switching section 22, a cross-fader 23, a cross-fader position detection section 24, the third selection switching section 25, a master volume control section 26, and A/D converters 27, 28, a DSP 29, a D/A converter 30, and a CPU 31.

It is possible to connect four DJ-compatible CD players in all (not shown) to the audio reproduction device thus configured. More specifically, an audio signal reproduced by the DJ-compatible CD player is input to each of the four channels denoted by CH1 to CH4, and then the signals can be subject to mixing described later according to a DJ's operation.

In FIG. 1, the equalizers 11 to 14 receive the audio signals associated with the CH1 to CH4, respectively, from the DJ-compatible CD players. The equalizers 11 to 14 add a prescribed frequency characteristic adjusted according to the operation to the respective input audio signals.

The level adjusters 15 to 18 receive the audio signals associated with the channels 1 to 4 output from the equalizers 11 to 14, respectively. The level adjusters 15 to 18 output the audio signals by level-converting the audio signals to a prescribed level adjusted according to the operation.

The first assigning switch section 19 connects to an output side of a particular channel selected according to the operation among from the four channels 1 to 4 (hereinafter referred to as the "channel A"). Similarly, the second assigning switch section 20 connects to an output side of a particular channel selected according to the operation among from the four channels 1 to 4 (hereinafter referred to as the "channel B"). In this way, in the audio reproduction device according to the present invention, two audio signals are arbitrarily selected among from those output from the four DJ-compatible CD players connected thereto, and the two audio signals are subject to the DJ's operation and the signal processing described later.

Figure 2:
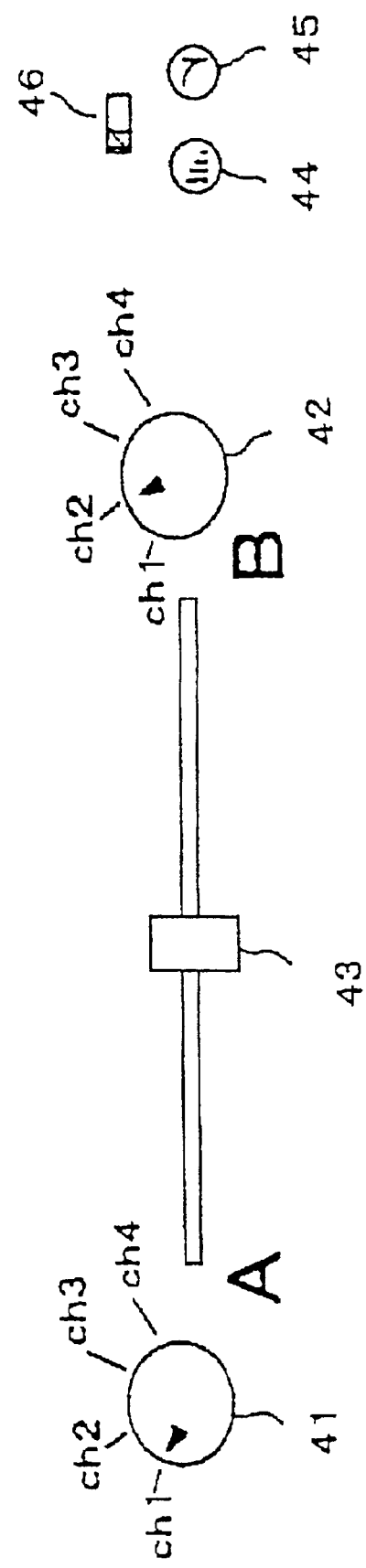
FIG. 2 is a view illustrating essential parts of an operation panel of the audio reproduction device.

Now, FIG. 2 shows essential parts of an operation panel for operating the audio reproduction device. In FIG. 2, an assigning switch 41 for channel A associated with the first assigning switch section 19 and an assigning switch 42 for channel B associated with the second assigning switch section 20 are provided. In the example shown in FIG. 2, the channel 1 is set as the channel A by the assigning switch 41 for channel A, and the channel 2 is set as the channel B by the assigning switch 42 for channel B.

The first switching section 21 is controlled to selectively connect the audio signal of the channel A, which is selected by the first assigning switch section 19, to the cross-fader 23 or the A/D converter 27. Besides, the second switching section 22 is controlled to selectively connect the audio signal of the channel B, which is selected by the second assigning switch section 20, to the cross-fader 23 or the A/D converter 28. A switching operation between the first assigning switch section 19 and the second assigning switch section 20 is controlled according to a mode associated with the DJ's operation.

In this embodiment, depending on the DJ's operation, there are two selectable modes, i.e., a normal mode for the operation utilizing a conventional cross-fader and an effect mode for adding an effect to the audio signal. As shown in FIG. 2, these two modes can be freely set by a mode setting switch 46. The first switching section 21 and the second switching section 22 are connected to the side of the cross-fader 23 when the normal mode is set, and to the side of the A/D converters 27, 28 when the effect mode is set.

The cross-fader 23 is provided with a cross-fader knob 43 on the operation panel (FIG. 2) and controls the volume of the audio signal of the channel A or B input selectively in the normal mode. The volume control by the cross-fader 23 may be conducted by adding a gain corresponding to the position of the cross-fader knob 43 to the audio signal through a VCA (voltage controlled amplifier).

The operation panel shown in FIG. 2 includes the cross-fader knob 43 serving as the operation device of the present invention. By operating the cross-fader knob 43 to move laterally, the volume in the cross-fader 23 can be varied in the normal mode, and a predetermined parameter for the effect processing by the DSP 26 can be controlled in the effect mode.

The cross-fader position detection section 24 is a device for detecting the position of the cross-fader knob 43 shown in FIG. 2 and sends a detection signal indicative of the cross-fader position to the CPU 31. As described later, the cross-fader position detected by the cross-fader position detection section 24 is used by the CPU 31 to control the operation of the DJ-compatible CD player or by the DSP 29 for signal processing.

The third selection switching section 25 is controlled to selectively connect one of the audio signal output from the cross-fader 23 and the audio signal effect-processed and output from the D/A converter 30 to the output side. The third selection switching section 25 is connected to the side of the cross-fader 23 in the normal mode, and to the side of the D/A converter 30 in the effect mode.

The master volume (VR) control section 26 performs the final volume control on the audio signal output from the third selection switching section 25. The output signal from the master volume control section 26 is supplied to a loudspeaker and the other audio equipment externally, which are connected thereto.

Now, components provided for the effect processing in the audio reproduction device will be described. In this embodiment, the effect processing performed on the audio signal is implemented through a digital signal processing technique. Thus, the A/D converters 27 and 28 sample the audio signals output from the switching sections 21 and 22, respectively, and convert them into digital signals.

The DSP (digital signal processor) 29 serving as the signal processing device of the present invention is a processor that performs a numerical calculation required for the digital signal processing at high speed, and implements various kinds of effect processing and mixing on the digital signals of the channel A or B obtained via the A/D converters 27, 28. The DSP 29 comprises a memory for retaining the digital signal to be processed and performs the effect processing or the like by reading from the memory. A specific effect processing performed by the DSP 29 will be described later.

The operation panel shown in FIG. 2 is provided with effect keys 44, 45 for setting plural kinds of effect processing in the DSP 29. In the example shown in FIG. 2, the effect key 44 is associated with an effect of "ZIP" for varying a musical interval of a number while keeping the speed constant, and the effect key 45 is associated with an effect of "echo" for adding an echo effect to a predetermined part of the number. Besides these effects, various kinds of effects may be implemented. However, in the following description, the effect of echo will be described.

The CPU 31, which serves as the control device of the present invention, controls totally the operation of the audio reproduction device according to this embodiment. The CPU 31 recognizes the operation conditions on the operation panel shown in FIG. 5 and controls the signal processing performed by the DSP 29 according to the DJ's operation. In addition, the CPU 31 sends a control signal to the DJ-compatible CD player externally connected thereto to control functions, such as reproduction or pause, or operational conditions including a reproduction speed, according to the DJ's operation.

Figure 3:
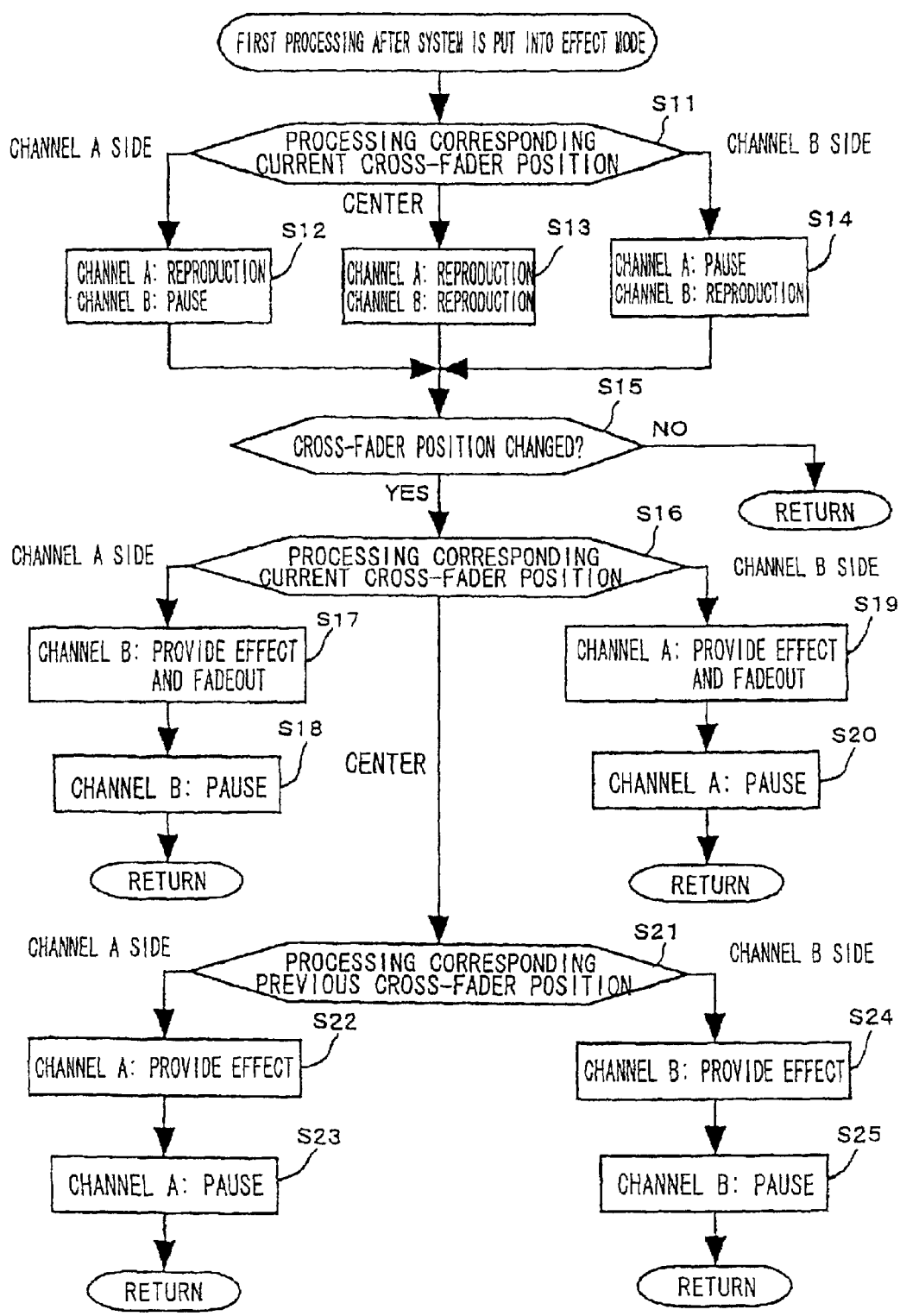
FIG. 3 is a flow chart illustrating the first processing after a system is put into an effect mode.
Figure 4:
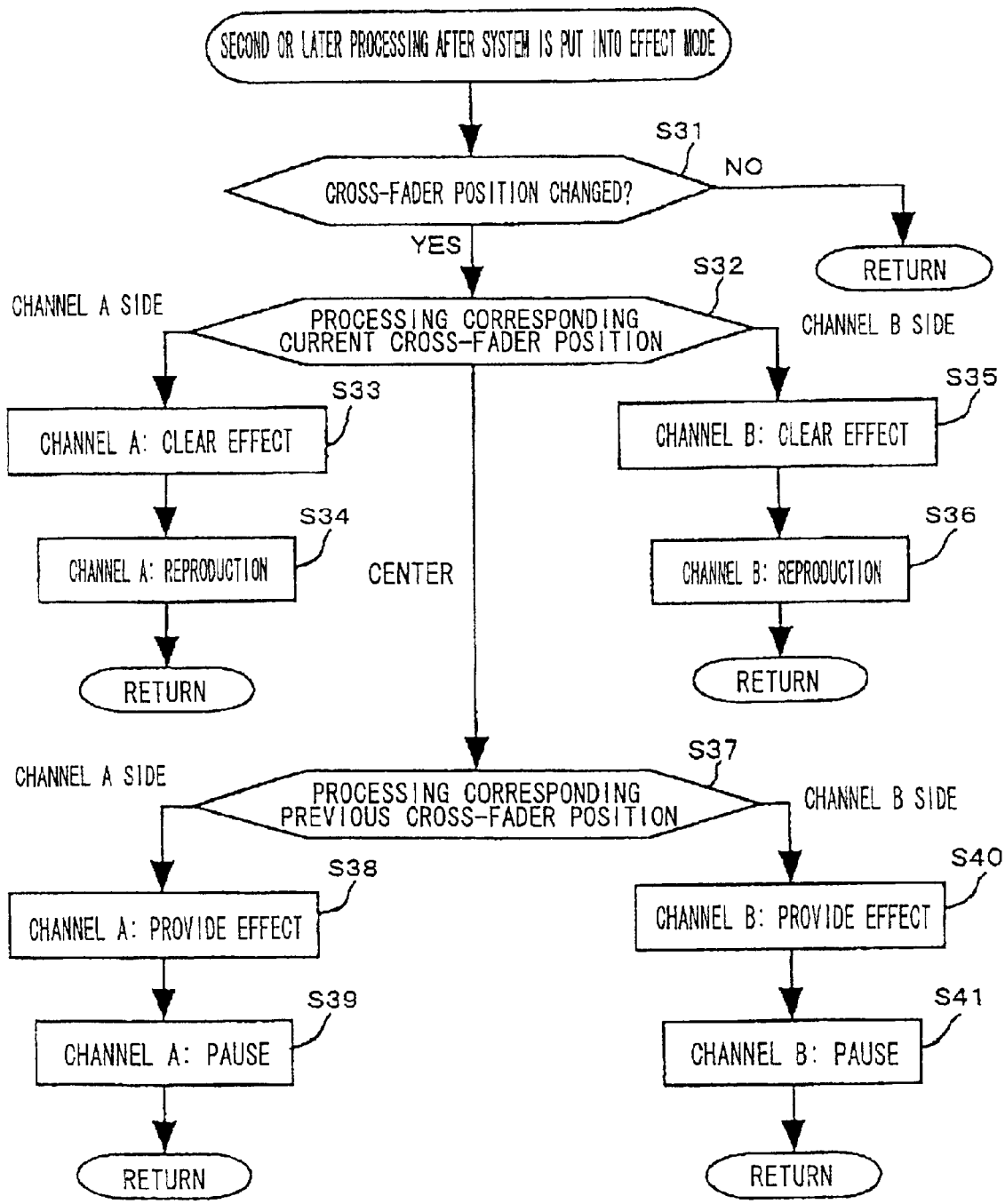
FIG. 4 is a flow chart illustrating the second or later processing after the system is put into the effect mode.

Now, an operation of the audio reproduction device according to this embodiment will be described with reference to FIGS. 3 to 5. In the audio reproduction device according to this embodiment, when it starts to operate after the system is put into the effect mode, the processing performed immediately after the system is put into the effect mode is slightly different from that performed after that. First, the processing shown in the flow chart of FIG. 3 is performed immediately after the system is put into the effect mode, and then the processing shown in the flow chart of FIG. 4 is performed, and after that, the processing shown in the flow chart of FIG. 4 is repeated at a predetermined timing under the control of the CPU 31. Here, a predetermined flag may be prepared for determining which processing shown in FIG. 3 or 4 is to be performed, and the processings may be differentiated from each another by referring to the flag.

As shown in FIG. 3, when the first processing after the system is put into the effect mode is started, the detection signal for the cross-fader position from the cross-fader position detection section 24 is identified to determine processings to be performed on the channels A and B in accordance with the current cross-fader position resulting from the operation of the cross-fader knob 43 (Step S11). Here, as shown in FIG. 5, three cross-fader positions resulting from the operation of the cross-fader knob 43 are defined.

Figure 5:
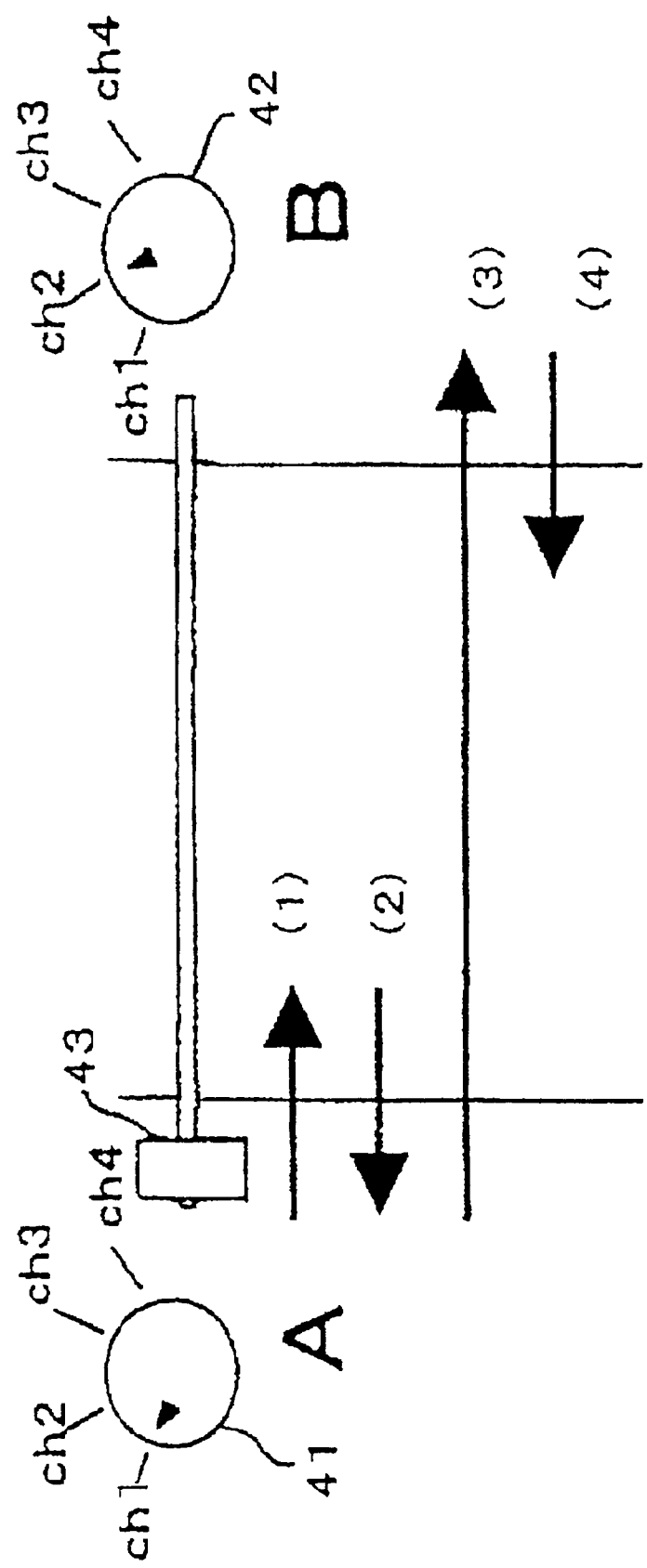
FIG. 5 is a view illustrating a specific operation when a cross-fader knob on the operation panel is operated.

In FIG. 5, for the cross-fader position resulting from the lateral operation of the cross-fader knob 43, two operation detecting points A and B are set as reference positions. When the cross-fader knob 43 is located on the left-hand side of the operation detecting point A, the cross-fader position is defined to be on the channel A side. When the cross-fader knob 43 is located on the right-hand side of the operation detecting point B, the cross-fader position is defined to be on the channel B side. When the cross-fader knob 43 is located between the operation detecting point A and the operation detecting point B, the cross-fader position is defined to be in the center.

Then, in accordance with the determination in Step S11, operation control steps S12 to S14 are conducted by sending a control signal from the CPU 31 to each of the DJ-compatible CD players associated with the channels A and B. Here, under the circumstance where the effect mode is set, the first selection switching section 21 and the second selection switching section 22 are switched to the sides of the A/D converters 27 and 28, respectively, and the digital signal processing is performed by the DSP 29.

In case where the cross-fader position is judged to be on the channel A side in Step S11, the DJ-compatible CD player associated with the channel A is caused to start the reproduction operation, and the DJ-compatible CD player associated with the channel B is caused to pause (Step S12). Similarly, in case where the cross-fader position is judged to be on the channel B side, the DJ-compatible CD player associated with the channel A is caused to pause, and the DJ-compatible CD player associated with the channel B is caused to start the reproduction operation (Step S14). Consequently, the audio signal is output only through the channel indicated by the cross-fader position.

In case where the cross-fader position is judged to be in the center, the DJ-compatible CD players associated with both the channels A and B are caused to start the reproduction operation (Step S13). Consequently, audio signals of the two channels are output after being mixed in the DSP 29. In this example, it is only immediately after the system is put into the effect mode as shown in FIG. 3 that two channels are mixed in the effect mode as in the normal mode.

Then, the operation of the cross-fader knob 43 is monitored to judge whether the cross-fader position is changed or not (Step S15). As a result, in case where the cross-fader position is the same as the previous state (if "NO" in Step S15), the processing shown in FIG. 3 is ended. In this case, an original state is maintained.

On the contrary, if the cross-fader position is changed from the previous state (if "YES" in Step S15), the processing to be performed is determined according to the current cross-fader position (Step S16). If the cross-fader position is judged to be on the channel A side resulting from the determination in step S16, a predetermined effect based on the effect processing in the DSP 29 is added to the audio signal of the channel B being reproduced and the audio signal is faded out (Step S17). The CD player associated with the channel B is caused to pause under the control of the CPU 29 (Step S18). Similarly, if the cross-fader position is judged to be on the channel B side, a predetermined effect based on the effect processing in the DSP 29 is added to the audio signal of the channel A being reproduced and the audio signal is faded out (Step S19). The DJ-compatible CD player associated with the channel A is caused to pause under the control of the CPU 29 (Step S20). Here, when Step S18 or S20 is completed, the processing shown in FIG. 3 is ended.

As a result of performing Steps S17 to S20, of the two channels having been reproduced theretofore, reproduction of the channel on the other side of the cross-fader position is stopped, so that only the channel on the side of the cross-fader position is reproduced. At that time, the audio signal of the channel, in which reproduction is to be stopped, is subject to an effect processing, such as echo, so that a successful performance effect can be provided when the two numbers are joined together.

If the cross-fader position is judged to be in the center resulting from the determination in Step S16, the processing to be performed is determined according to the previous cross-fader position (Step S21). More specifically, in case where the cross-fader knob 43 is operated so that the position of the cross-fader is shifted from the left-hand side or the right-hand side to the center, the processing depends on from which side, i.e., the channel A side or channel B side, the cross-fader position is shifted to the center. If the previous cross-fader position is judged to be on the channel A side resulting from the determination in Step S21, a predetermined effect based on the effect processing in the DSP 29 is added to the audio signal of the channel A (Step S22). Then, the DJ-compatible CD player associated with the channel A is caused to pause (Step S23).

Similarly, if the previous cross-fader position is judged to be on the channel B side resulting from the determination in Step S21, a predetermined effect based on the effect processing in the DSP 29 is added to the audio signal of the channel B (Step S24). Then, the DJ-compatible CD player associated with the channel B is caused to pause (Step S25).

The processing in Steps S22 to S25 is based on the assumption that the cross-fader is shifted from the previous position over the central position in which the cross-fader is currently located, to the position on the opposite side. Accordingly, a successful performance effect can be provided by stopping reproduction of the channel associated with the previous cross-fader position and adding an effect to the audio signal. Here, when Step S23 or S25 is completed, the processing shown in FIG. 3 is ended.

Now, the processing shown in FIG. 4 subsequent to the processing shown in FIG. 3 in the effect mode will be described. The processing in FIG. 4 is repeated at a predetermined timing during operation of the information reproduction device. For example, when shifted to the processing in FIG. 4, it is judged whether the cross-fader position is changed or not by referring to the predetermined flag described above (Step S31). Step S31 is the same as Step S15 in FIG. 3. If the cross-fader position is changed from the previous position, a processing of shifting to Step S32 is performed successively.

Then, the processing to be performed is determined according to the current cross-fader position (Step S32). If the cross-fader position is judged to be on the channel A side resulting from the determination in Step S32, the effect currently added to the audio signal of the channel A is cancelled (Step S33). Then, normal reproduction of the channel A is started (Step S34), and the processing in FIG. 4 is ended. Similarly, if the cross-fader position is judged to be on the channel B side resulting from the determination in Step S32, the effect currently added to the audio signal of the channel B is cancelled (Step S35). Then, normal reproduction of the channel B is started (Step S36), and the processing in FIG. 4 is ended.

If the cross-fader position is judged to be in the center resulting from the determination in Step S32, the processing to be performed is determined according to the previous cross-fader position (Step S37). Step S37 corresponds to Step S21 in FIG. 3. Therefore, Steps S38 and S39, which are performed in case where the previous cross-fader position is judged to be on the channel A side resulting from the determination in Step S37, are the same as Steps S22 and S23 in FIG. 3, respectively. Furthermore, Steps S40 and S41, which are performed in case where the previous cross-fader position is judged to be on the channel B side, are the same as Steps S24 and S25 in FIG. 3, respectively. Here, when Step S39 or S41 is completed, the processing shown in FIG. 4 is ended.

Now, a specific operation will be described with reference to FIG. 5 when the cross-fader knob 43 on the operation panel is operated according to the processing shown in FIGS. 3 and 4. An operation in the case where a sequential operation over the operation detecting points A and B is implemented with the cross-fader knob 43 will be considered herein. In FIG. 5, the cross-fader knob 43 is subject to sequential operations (1) to (4) indicated by arrows. In FIG. 5, the channel 1 is set as the channel A by the assigning switch 41 for channel A, and the channel 2 is set as the channel B by the assigning switch 42 for channel B, as shown in FIG. 2. In addition, while other keys and the like are omitted in FIG. 5, the effect mode is set by the mode setting switch 46 shown in FIG. 2, and the "echo" is set as the effect processing by the effect key 45.

In the operation (1) shown in FIG. 5, the cross-fader knob 43 is moved rightward so that the cross-fader position is shifted from the channel A side toward the center beyond the operation detecting point A. In this case, assuming that the processing shown in FIG. 3 is performed, the current cross-fader position is judged to be in the center in Step S16 after completion of Step S15. Then, the previous cross-fader position is judged to be on the channel A side in Step S21, and Steps S22 and S23 are executed.

Through the operation (1) described above, the audio signal of the channel 1 being reproduced is repeatedly reproduced with the echo effect added thereto. More specifically, a predetermined part of the number for the channel 1 is repeatedly reproduced in a short cycle with the echo effect added thereto, and the volume thereof is gradually reduced with the movement of the cross-fader knob 43. At that time, the DSP 29 utilizes the digital signal retained in the memory to conduct the effect processing for echo, so that the DJ-compatible CD player associated with the channel 1 is controlled to pause. In addition, the state of the DJ-compatible CD player associated with the channel 2 is maintained, and it normally pauses at a predetermined position.

In the operation (2) shown in FIG. 5, the cross-fader knob 43 is moved leftward so that the cross-fader position is returned from the center to the channel A side beyond the operation detecting point A. In this case, in the processing shown in FIG. 4, the current cross-fader position is judged to be on the channel A side in Step S32 after completion of Step S31, and Steps S33 and S34 are executed.

Through the operation (2) described above, the effect processing for the channel 1 performed by the DSP 29 in accordance with the operation (1) is stopped, and the DJ-compatible CD player associated with the channel 1 starts again reproduction from the position of pause. Here, the state of the DJ-compatible CD player associated with the channel 2 is maintained.

In the operation (3) shown in FIG. 5, the cross-fader knob 43 is moved rightward again so that the cross-fader position is shifted to the channel B side beyond the operation detecting point A, passing through the central position, and beyond also the operation detecting point B. In this case, in the processing shown in FIG. 4, when the current cross-fader position is in the center, Steps S38 and S39 are executed via Steps S31, S32, and S37. Then, when the current cross-fader position is shifted to the channel B side, Steps S35 and S36 are executed via Steps S31 and S32.

Through the operation caused by the operation (3) described above, in addition to the operation caused by the operation (1), the cross-fader position reaches the channel B side, so that transition from the channel 1 to the channel 2 while adding the echo effect to the channel 1 is possible. At the time when the cross-fader position reaches the channel B side, the DJ-compatible CD player associated with the channel 2 starts again reproduction from the position of pause.

Figure 6:
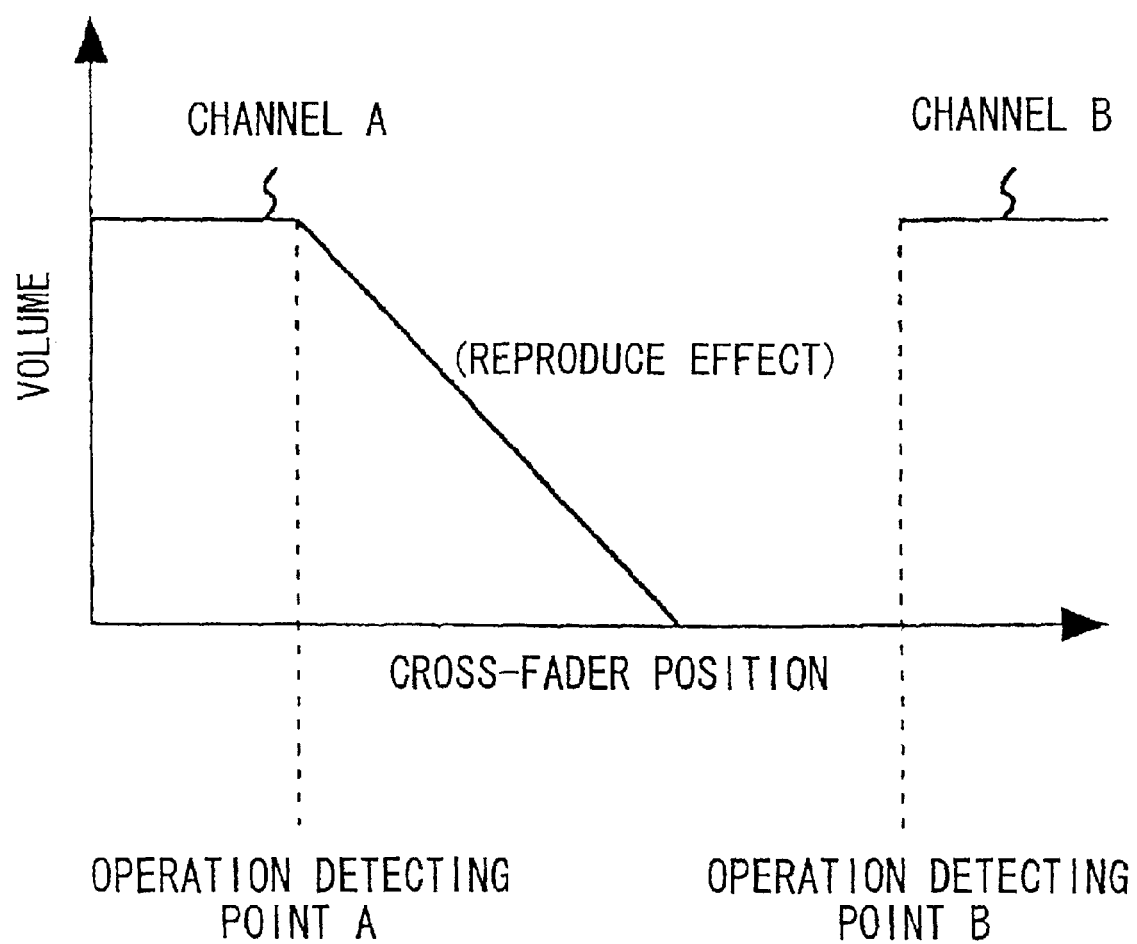
FIG. 6 illustrates an example of a volume control of each channel associated with a cross-fader position.

Now, volume variation caused when the cross-fader knob 43 is operated according to the operation (3) will be described. FIG. 6 illustrates a volume control of each channel associated with cross-fader position, and corresponds to the case of the operation (3). As shown in FIG. 6, in a region on the left-hand side of the operation detecting point A, the volume does not vary according to the cross-fader position, and the channel A is normally reproduced. In a region from the operation detecting point A to the operation detecting point B, the effect processing is added to the channel A, and the volume is reduced as the cross-fader position is shifted rightward, and the volume becomes zero at a predetermined position. In a region on the right-hand side of the operation detecting point B, the volume does not vary according to the cross-fader position, and the channel B is normally reproduced. In this way, since the cross-fader knob 43 enables addition of the effect to the audio signal and control of the volume simultaneously, an improved operability is provided.

While in the example shown in FIG. 6, the volume of the audio signal to be processed is associated with the cross-fader position, any parameter other than the volume may be controlled by associating it with the cross-fader position. For example, various parameters including a period or frequency characteristic of the audio signal to be effect-processed, an attenuation characteristic of echo, and a frequency variation of ZIP may be associated with the cross-fader position. Alternatively, a fixed effect processing may be performed within a region between the operation detecting points A and B without varying the parameter according to the cross-fader position.

Finally, in the operation (4) shown in FIG. 5, the cross-fader knob 43 is moved leftward again so that the cross-fader position is returned to the central position from the channel B side beyond the operation detecting point B. In this case, in the processing shown in FIG. 4, Steps S40 and S41 are executed via Steps S31, S32 and S37.

Through the operation (4) described above, the audio signal of the channel 2 being reproduced is repeatedly reproduced with the echo effect added thereto. More specifically, the same operation performed on the channel 1 during the operation (1) is performed on the channel 2 during the operation (4). Here, the relationship between the cross-fader position and the volume of the channel 2 when the cross fader moves over the operation detecting point B is represented by the same graph shown in FIG. 6 but reversed laterally.

As described above, with the audio reproduction device according to this embodiment, by operating the cross-fader knob 43 to move, an effect can be added to the audio signal when joining two numbers together through the DJ's operation. Thus, while in the past, when two numbers are to be joined together, it has been required to perform operations of controlling the volume thereof with the cross-fader and adding the effect thereto separately, these operations can be simultaneously performed. Therefore, a complicated operation in the DJ's operation become unnecessary so that it is possible to prevent the operation from being failed and to provide an improved functionality by selectively adding an effect to the audio signal.

In this embodiment, a configuration in which a plurality of DJ-compatible CD players is externally connected to the audio reproduction device is described. However, the present invention is not limited only thereto and can be applied to the audio reproduction device integral with a plurality of DJ-compatible CD players. In addition, the recording medium used by the reproduction device is not limited to CD, and the present invention can be applied to cases where various information recording medium are used.

As described above, according to the present invention, since the audio signal is processed according to the operation with the use of the operation device to add an effect to the signal, an audio signal processor that exhibits high operability and functionality when two numbers are to be joined together through the DJ's operation can be provided.

The entire disclosure of Japanese Patent Application No. 2001-133292 filed on Apr. 27, 2001 including the specification, claims, drawings and summary is incorporated herein by reference in its entirety.

What is claimed is:

1. An audio signal processor for performing a signal processing on a first audio signal and a second audio signal in correspondence with an operation to produce an output, comprising:
   an operation device operatively movable between one end and an other end, said one end being associated with said first audio signal and said other end being associated with said second audio signal;
   a signal processing device for performing a signal processing on any one of said first audio signal and said second audio signal to provide at least one kind of predetermined effect; and
   a control device for controlling said signal processing device so that said effect is provided for any one of said first audio signal and said second audio signal at a predetermined timing based on a position of said operation device and a moving direction thereof.

2. The audio signal processor according to claim 1, wherein the position of said operation device corresponds to a predetermined parameter associated with said effect.

3. The audio signal processor according to claim 2, wherein said parameter is a volume of said first audio signal or said second audio signal for which said effect is provided.

4. The audio signal processor according to claim 1, wherein a first reference position is set in a vicinity of said one end for said operation device, and a second reference position is set in a vicinity of said other end for said operation device, and
   said effect is provided for any one of said first audio signal and said second audio signal, when said operation device is located between said first reference position and said second reference position.

5. The audio signal processor according to claim 4, wherein said effect is provided for said first audio signal, when said operation device moves from a side of said one end over said first reference position, and said effect is provided for said second audio signal, when said operation device moves from a side of said other end over said second reference position.

6. The audio signal processor according to claim 1, wherein said signal processing device is capable of providing a plurality of kinds of effect serving as said at least one kind of predetermined effect, and
   the audio signal processor further comprises effect setting device for selectively setting an effect to be provided for said first audio signal or said second audio signal among from said plurality of kinds of effect.

7. The audio signal processor according to claim 1, further comprising: a mode setting device for selectively setting any one of an effect mode and a normal mode; and a cross-fader for outputting said first audio signal and said second audio signal in a mixed state in a prescribed ratio based on the position of said operation device, wherein said control device conducts control in such a manner that when said effect mode is set, said first audio signal and said second audio signal are processed by said signal processing device, and when said normal mode is set, said first audio signal and said second audio signal are output through said cross-fader.

8. The audio signal processor according to claim 1, wherein said first audio signal and said second audio signal are supplied from a reproduction device in which an operation condition can be controlled, and the operation condition of said reproduction device is controlled based on the position of said operation device and the moving direction thereof.

9. The audio signal processor according to claim 8, wherein said reproduction device is a disc player for reproducing the audio signal recorded in a disc type recording medium.

* * * * *